United States Patent
Li et al.

(10) Patent No.: US 7,652,983 B1
(45) Date of Patent: Jan. 26, 2010

(54) METHOD FOR RESTORATION AND NORMALIZATION IN A MESH NETWORK

(75) Inventors: Guangzhi Li, Harrison, NJ (US); Jennifer Yates, Madison, NJ (US); Dongmei Wang, Harrison, NJ (US); Charles Robert Kalman, Short Hills, NJ (US)

(73) Assignee: AT&T Intellectual Property II, L.P., Bedminster, NJ (US)

( * ) Notice: Subject to any disclaimer, the term of this patent is extended or adjusted under 35 U.S.C. 154(b) by 1119 days.

(21) Appl. No.: 10/064,251

(22) Filed: Jun. 25, 2002

Related U.S. Application Data

(60) Provisional application No. 60/300,769, filed on Jun. 25, 2001.

(51) Int. Cl.
*G06F 11/20* (2006.01)

(52) U.S. Cl. .................... 370/217; 370/228; 709/239; 398/5

(58) Field of Classification Search ......... 370/216–228, 370/241–244, 250, 400, 401, 406; 714/100, 714/1, 2; 709/239; 379/221.1, 221.04; 398/1–8
See application file for complete search history.

(56) References Cited

U.S. PATENT DOCUMENTS

| | | | |
|---|---|---|---|
| 5,218,601 A | 6/1993 | Chujo | |
| 5,495,471 A | 2/1996 | Chow | |
| 5,742,605 A | 4/1998 | Norman | |
| 5,812,524 A | 9/1998 | Moran | |
| 5,850,505 A | 12/1998 | Grover | |
| 5,856,981 A * | 1/1999 | Voelker | 714/712 |
| 5,941,992 A | 8/1999 | Croslin | |
| 5,943,314 A | 8/1999 | Croslin | |
| 5,974,027 A | 10/1999 | Chapman | |
| 6,021,113 A * | 2/2000 | Doshi et al. | 370/228 |
| 6,044,064 A * | 3/2000 | Brimmage et al. | 370/248 |
| 6,052,360 A | 4/2000 | Rogers | |
| 6,073,248 A * | 6/2000 | Doshi et al. | 714/4 |
| 6,130,875 A * | 10/2000 | Doshi et al. | 370/225 |
| 6,134,671 A | 10/2000 | Commerford | |
| 6,137,775 A | 10/2000 | Bartlett | |
| 6,151,304 A | 11/2000 | Doshi | |
| 6,163,525 A | 12/2000 | Bentall | |
| 6,205,117 B1 * | 3/2001 | Doshi et al. | 370/228 |
| 6,222,821 B1 * | 4/2001 | Sees et al. | 370/227 |
| 6,225,999 B1 | 5/2001 | Jain | |
| 6,282,170 B1 | 8/2001 | Bentall | |
| 6,324,162 B1 | 11/2001 | Chaudhuri | |
| 6,353,593 B1 | 3/2002 | Chen | |
| 6,359,857 B1 | 3/2002 | Ahmad | |

(Continued)

OTHER PUBLICATIONS

Byeongsik Kim, Woojik Chan, Janeho Yoo, "Constraint-based LSP setup message reversing of CR-LDP", pp. 875-880, IEEE, Feb. 2, 2001.*

(Continued)

*Primary Examiner*—Aung S Moe
*Assistant Examiner*—Habte Mered
(74) *Attorney, Agent, or Firm*—Michael Haynes PLC; Michael N. Haynes

(57) ABSTRACT

The present invention is directed to methods for signaling that enable bandwidth reservation, path restoration, path normalization, and path removal in a mesh network that supports shared mesh restoration.

20 Claims, 8 Drawing Sheets

U.S. PATENT DOCUMENTS

| | | | |
|---|---|---|---|
| 6,366,556 B1* | 4/2002 | Ballintine et al. | 370/216 |
| 6,366,761 B1* | 4/2002 | Montpetit | 455/12.1 |
| 6,377,543 B1 | 4/2002 | Grover | |
| 6,392,992 B1 | 5/2002 | Phelps | |
| 6,421,349 B1* | 7/2002 | Grover | 370/408 |
| 6,426,941 B1 | 7/2002 | Vaman | |
| 6,442,132 B1* | 8/2002 | Burns et al. | 370/218 |
| 6,542,934 B1* | 4/2003 | Bader et al. | 709/239 |
| 6,549,513 B1 | 4/2003 | Chao | |
| 6,600,719 B1 | 7/2003 | Chaudhuri | |
| 6,606,299 B1* | 8/2003 | Kurosawa et al. | 370/225 |
| 6,646,656 B1 | 11/2003 | Walker | |
| 6,725,401 B1* | 4/2004 | Lindhorst-Ko | 714/47 |
| 6,728,205 B1* | 4/2004 | Finn et al. | 370/217 |
| 6,741,572 B1* | 5/2004 | Graves et al. | 370/254 |
| 6,744,727 B2 | 6/2004 | Liu | |
| 6,804,199 B1 | 10/2004 | Kelly | |
| 6,882,627 B2* | 4/2005 | Pieda et al. | 370/248 |
| 6,901,053 B1 | 5/2005 | Davies | |
| 6,970,417 B1 | 11/2005 | Doverspike | |
| 6,982,951 B2 | 1/2006 | Doverspike | |
| 7,039,009 B2* | 5/2006 | Chaudhuri et al. | 370/225 |
| 7,088,676 B1 | 8/2006 | Doverspike | |
| 7,099,327 B1* | 8/2006 | Nagarajan et al. | 370/394 |
| 7,180,852 B1 | 2/2007 | Doverspike | |
| 7,298,700 B1 | 11/2007 | Doverspike | |
| 7,450,496 B1 | 11/2008 | Doverspike | |
| 2001/0032271 A1* | 10/2001 | Allen | 709/239 |
| 2001/0036153 A1* | 11/2001 | Sasaki et al. | 370/218 |
| 2001/0050790 A1* | 12/2001 | Graves et al. | 359/110 |
| 2002/0057691 A1 | 5/2002 | Enoki | |
| 2002/0191247 A1* | 12/2002 | Lu et al. | 359/124 |
| 2002/0191250 A1* | 12/2002 | Graves et al. | 359/128 |
| 2004/0105383 A1 | 6/2004 | Agrawal | |

OTHER PUBLICATIONS

Kini et al, "ReSerVation Protocol with Traffic Engineering extensions, Extension for Label Switched Path restoration", IETF, Apr. 2001.*

Ashwood-Smith, "Generalized MPLS—CR-LDP Extensions, IETF Network Working Group, Internet Draft", Nov. 1, 2000, 16 page(s).

Ashwood-Smith, "Generalized MPLS—Signaling Functional Description, IETF Network Working Group, Internet Draft", Nov. 1, 2000, 28 page(s).

Awduche, "Multi-Protocol Lambda Switching: Combining MPLS Traffic Engineering Control with Optical Crossconnects, IETF Internet Draft", Nov. 1, 1999, 18 page(s), http://www.ietf.org/internet-drafts/draft-awduche-mpls-te-optical-01.txt.

Awduche, "RSVP-TE: Extensions to RSVP for LSP Tunnels, IETF Network Working Group, Internet Draft", Jul. 1, 2000, 61 page(s).

Berger, "Generalized MPLS—RSVP-TE Extensions, draft—Network Working Group Internet Draft", Nov. 1, 2000, 21 page(s).

Braden, Ed., et al., "RSVP—Version 1 Functional Specification", Sep. 1, 1997, 111 page(s), Nework Working Group.

Gan, "A Method for MPLS LSP Fast-Reroute Using RSVP Detours, IETF Internet Draft", Apr. 10, 2001, 13 page(s).

Jamoussi, "Constraint-Based LSP Setup Using LDP, IETF Network Working Group, Internet Draft", Jul. 1, 2000, 35 page(s).

Kini, "Reservation Protocol with Traffic Engineering Extensions—Extension for Label Switched Patch Restoration, IETF Internet Draft", Nov. 1, 2000, 9 page(s).

Lang, "Link Management Protocol, IETF Network Working Group, Internet Draft", Nov. 1, 2001, 60 page(s).

Li, "Experiments in fast restoration using GMPLS in optical/electronic mesh networks", Mar. 17, 2001, 3 page(s), Optical Fiber Communication Conference and Exhibit, 2001, OFC.

McAdams, "User to Network Interface (UNI) Service Definition and Connection Attributes", Jan. 1, 2000, OIF Architecture Group, OIF2000.61 (2000).

Kompella, "IS-IS Extensions in Support of Generalize MPLS", Feb. 1, 2001, 12 page(s), IETF.

Kompella, "OSPF Extensions in Support of Generalized MPLS", Feb. 1, 2001, 13 page(s), IETF.

* cited by examiner

Figures

```
<PATH Message> ::==    <Common Header>
                       [<INTEGRITY>]
                       [ <MESSAGE_ID_ACK> | <MESSAGE_ID_NACK> ]
                       [ <MESSAGE_ID> ]
                       <SESSION>
                       <RSVP_HOP>
                       <TIME_VALUES>
                       [ <EXPLICITE_ROUTE> ]
                       <LABEL_REQUEST >
                       [ <SERVICE_PATH_INFORMATION> ]
                       [ <PROTECTION> ]
                       [ <LABEL_SET> ]
                       [ <SESSION_ATTRIBUTE> ]
                       [ <NOTIFY_REQUEST> ]
                       [ <POLICY_DATA>     ]
                       <sender descriptor>
```

FIG. 3

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|S|R|               Reserved                  | Link Flags|
+-+-+-+-+-+-+-+-+-+-+-+-+-+-+-+-+-+-+-+-+-+-+-+-+-+-+-+-+-+-+-+-+
```

FIG. 3A

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                          SRLG 1                              |
|-+-+-+-+-+-+-+-+-+-+-+-+-+-+-+-+-+-+-+-+-+-+-+-+-+-+-+-+-+-+-+-+
|                          SRLG 2                              |
|-+-+-+-+-+-+-+-+-+-+-+-+-+-+-+-+-+-+-+-+-+-+-+-+-+-+-+-+-+-+-+-+
|                          ......                              |
|-+-+-+-+-+-+-+-+-+-+-+-+-+-+-+-+-+-+-+-+-+-+-+-+-+-+-+-+-+-+-+-+
|                          SRLG n                              |
|-+-+-+-+-+-+-+-+-+-+-+-+-+-+-+-+-+-+-+-+-+-+-+-+-+-+-+-+-+-+-+-+
```

FIG. 3B

```
<Notify message> ::=    <Common Header>
                        [<INTEGRITY>]
                        [ [<MESSAGE_ID_ACK> | <MESSAGE_ID_NACK>] ... ]
                        [ <MESSAGE_ID> ]
                        <ERROR_SPEC>
                        <notify session list>

ERROR_SPEC object
   +-------------+-------------+-------------+-------------+
   |                  Error Node Address                   |
   +-------------+-------------+-------------+-------------+
   |    Flags    | Error Code  |        Error Value        |
   +-------------+-------------+-------------+-------------+

+ Bridging completed
                                 + Roll/Bridge completed
                                 + Roll completed
```

FIG. 6

```
<PATHTEAR Message> ::== <Common Header>
                       [<INTEGRITY>]
                       [ <MESSAGE_ID_ACK> | <MESSAGE_ID_NACK> ]
                       [ <MESSAGE_ID> ]
                       <SESSION>
                       <RSVP_HOP>
                       [ <EXPLICITE_ROUTE> ]
                       [ <SERVICE_PATH_INFORMATION> ]
                       [ <PROTECTION> ]
                       [ <SESSION_ATTRIBUTE> ]
                       <sender descriptor>
```

FIG. 9

METHOD FOR RESTORATION AND NORMALIZATION IN A MESH NETWORK

CROSS REFERENCE TO RELATED APPLICATIONS

This application claims priority to U.S. Provisional Application "RSVP-TE EXTENSIONS FOR SHARED-MESH RESTORATION IN TRANSPORT NETWORKS," Ser. No. 60/300,769, filed on Jun. 25, 2001, the contents of which are incorporated by reference herein.

This application is related to U.S. patent applications, "METHODS AND SYSTEMS FOR FAST RESTORATION IN A MESH NETWORK OF OPTICAL CROSS CONNECTS," Ser. No. 09/474,031, filed on Dec. 28, 1999; and "METHOD FOR SELECTING A RESTORATION PATH IN A MESH NETWORK," Ser. No. 09/909,102, filed on Jul. 19, 2001; which are incorporated by reference herein.

BACKGROUND OF INVENTION

The invention relates to telecommunications networks, and more particularly to restoration and normalization of a restored connection in a telecommunications network.

Rapid recovery/restoration from network failures is a crucial aspect of current and future telecommunication networks. Rapid restoration is required by transport network providers to support stringent Service Legal Agreements ("SLAs") that dictate high reliability and availability for customer connectivity. For example, and in the context of optical networking, Synchronous Optical Network (SONET) rings provide the primary technology for optical layer communication and restoration from network failures. SONET rings tend to be capacity utilization inefficient when compared to "mesh" topologies in networks with a high degree of connectivity and when, because of size limitations, connections are forced to route through many interconnected rings. As optical-cross connects (OXCs) are deployed within today's transport networks based on wavelength-division multiplexing (WDM), the potential emerges to provide on-demand establishment of high-bandwidth connections (also referred to in the art as "lightpaths" or "label switched paths (LSPs)"); Emerging standards such as Generalized MPLS ("GMPLS"), also referred to in the art as Multi-Protocol Lambda Switching ("MPL(ambda)S"), can provide a standardized optical network control plane that is essential for building an effective platform for vendor interoperability. See, e.g., D. Awduche et al., "Multi-Protocol Lambda Switching: Combining MPLS Traffic Engineering Control with Optical Crossconnects," IETF Internet Draft, http://www.ietf.org/internet-drafts/draft-awduche-mpls-te-optical-01.txt (November 1999). Unfortunately, few recent contributions to the art have addressed the need for fast failure restoration in such networks. GMPLS signaling proposals have primarily focused on the development of methods for label switched path ("LSP") establishment and removal—with limited fault recovery capabilities. In this specification, we will use the common terminology "LSP" for connection in transport network.

The choice of a restoration policy is a tradeoff between network resource utilization (cost) and service interruption time. Clearly, minimized service interruption time is desirable, but schemes achieving this usually do so at the expense of network resource utilization, resulting in increased cost to the provider. Significant reductions in spare capacity can be achieved by sharing restoration capacity across multiple restoration paths whose service paths do not fail at the same time during independent failures. In co-pending commonly-assigned U.S. Utility patent application, "METHODS AND SYSTEMS FOR FAST RESTORATION IN A MESH NETWORK OF OPTICAL CROSS CONNECTS," Ser. No. 09/474,031, filed on Dec. 28, 1999, which is incorporated by reference herein, a restoration methodology is disclosed that utilizes pre-computed restoration path disjoint from the normal service path—but wherein the channels/wavelengths may be chosen dynamically during the restoration process. The invention therein disclosed, referred to by the inventors herein generally as "shared mesh restoration", can potentially provide restoration competitive with SONET ring restoration speeds. Co-pending commonly-assigned U.S. Utility patent application, "METHOD FOR SELECTING A RESTORATION PATH IN A MESH NETWORK," Ser. No. 09/909,102, filed on Jul. 19, 2001, which is also incorporated by reference herein, discloses a distributed approach to selecting the restoration path in a shared mesh restoration scheme.

SUMMARY OF INVENTION

The present invention is directed to methods for signaling that enable bandwidth reservation, path restoration, path normalization, and path removal in a mesh network that supports shared mesh restoration. The necessary network failure restoration functionality can be advantageously provided by extensions to existing signaling protocols such as RSVP-TE. In accordance with an embodiment of an aspect of the invention, shared resources along a restoration path are reserved by sending a label switched path request with a shared restoration flag indicating that the reserved restoration resources are not to be allocated. The request also includes service path information in order to permit sufficient but necessary restoration capacity reservation along the restoration path to recover any independent shared risk link group (SRLG) failures along the service path. The service path information can alternatively comprise a list of links used along the service path or a list of shared risk link groups traversed by the service path. The restoration path is setup, upon notification of a service path failure, by issuing a label switched path request allocating the reserved restoration resources. Deletion of a restoration path also requires specification of the service path information in order to de-allocate the resources allocated to the label switched path.

Due to the sharing of restoration resources, it is necessary for a connection to return back to the service path after failure repair, which is referred to by the inventors as "restoration normalization." Then the released resources on the restoration path can be used to restore other failed service paths. The present invention is also directed to a novel method to accomplish the restoration normalization process within shared mesh restoration framework to achieve so-called "make-before-break" performance. A "bridge and roll" approach is disclosed for restoration normalization that advantageously permits minimal service traffic interruption. Also, it is preferable that the service path be verified prior to commencing the normalization process, and a verification procedure utilizing a protocol such as LMP is also disclosed.

These and other advantages of the invention will be apparent to those of ordinary skill in the art by reference to the following detailed description and the accompanying drawings.

BRIEF DESCRIPTION OF DRAWINGS

FIG. 3 is an illustrative format for a PATH message, supporting shared restoration resource reservation. FIG. 3A is an illustrative format for a protection information object in a PATH message. FIG. 3B is an illustrative format for an SRLG list in a service path information object in a PATH message.

FIG. 6 is an illustrative format for a NOTIFICATION message, supporting path normalization.

FIG. 9 is an illustrative format for a PATHTEAR message, supporting shared restoration.

DETAILED DESCRIPTION

Figure 1:
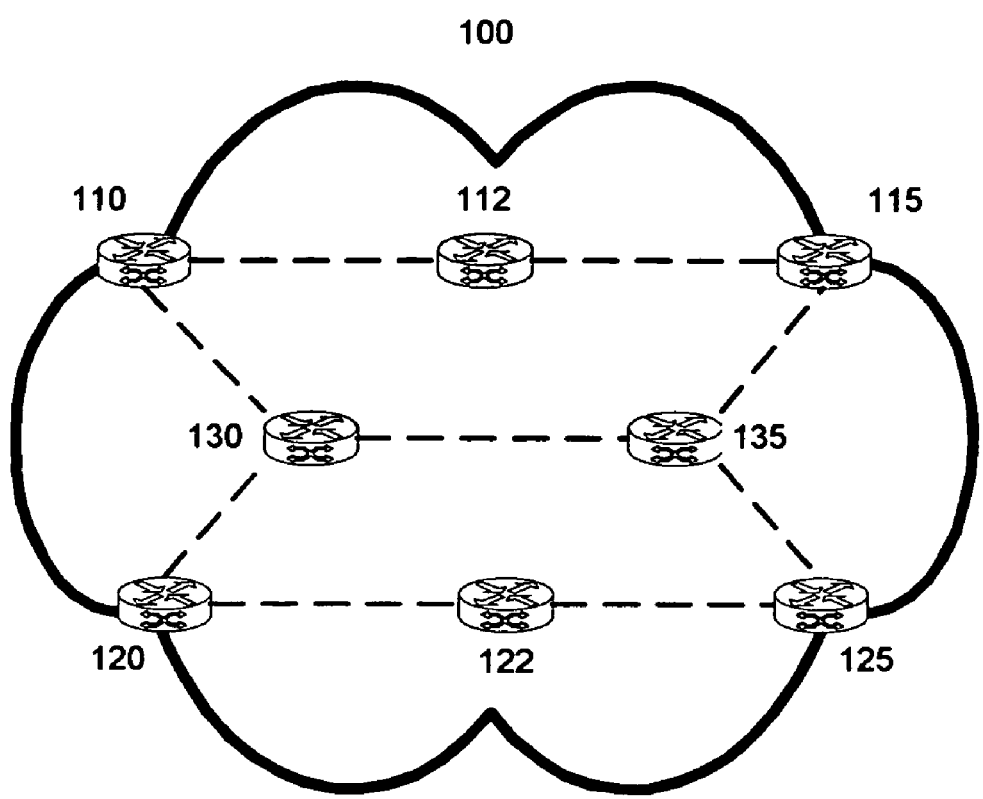
FIG. 1 is a diagram of a label switched network, illustrating the sharing of restoration resources.

FIG. 1 is a diagram of a label switched network 100. The nodes 110, 112, 115, 120, 122, 125, 130, 135 of the network 100 are arranged in a mesh topology illustrating the sharing of restoration bandwidth across multiple independent failures.

A label switched path ("LSP") through the network 100 is established using the exchange of label distribution messages between adjacent nodes. See P. Ashwood-Smith, et al., "Generalized MPLS—Signaling Functional Description;" IETF Network Working Group, Internet Draft, http://www.ietf.org/internet-drafts/draft-ietf-mpls-generalized-signaling-0.1.txt (November 2000), which is incorporated by reference herein. The current GMPLS signaling specification is based on extensions to existing protocols—namely RSVP-TE and CR-LDP. See, e.g., L. Berger, et al., "Generalized MPLS Signaling—RSVP-TE Extensions," IETF Network Working Group, Internet Draft, httpp://www.ietf.org/internet-drafts/draft-ietf-mpls-generalized-rsvp-te-00.txt (November 2000); and P. Ashwood-Smith, et al., "Generalized MPLS Signaling—CR-LDP Extensions," IETF Network Working Group, Internet Draft, http://www.ietf.org/internet-drafts/draft-ietf-mpls-generalized-cr-ldp-00.txt (November 2000); which are incorporated by reference herein. See also, D. Awduche, et al., "RSVP-TE: Extensions to RSVP for LSP tunnels," IETF Network Working Group, Internet Draft, http://www.ietf.org/internet-drafts/draft-ietf-mpls-rsvp-lsp-tunnel-06.txt (July 2000) and B Jamoussi, et al., "Constraint-Based LSP Setup using LDP," IETF Network Working Group, Internet Draft, http://www.ietf.org/internet-drafts/draft-ietf-mpls-cr-ldp-04.txt (July 2000), which are incorporated by reference herein. The present invention shall be described herein for illustration purposes with particular reference to extensions to RSVP-TE signaling messages.

A restorable LSP in a transport network supporting shared mesh restoration has both a service (primary) path and a restoration (secondary) path. During normal network operation (without failures), the LSP is established along the service path, with resources (optionally) reserved along the restoration path. With reference to FIG. 1, consider an LSP established between node 110 and node 115, and another between node 120 and node 125. The service and restoration paths for the LSP between 110 and 115 are 110-112-115 and 110-130-135-115, respectively, whilst the service and restoration paths for the LSP between 120 and 125 are 120-122-125 and 120-130-135-125, respectively. Thus, the link between nodes 130 and 135 has capacity reserved for the failure of both the service paths. If the service provider wishes to guarantee recovery from any single failure event, and if the links along the two service paths do not have any common failure, then a single unit of capacity may be reserved on the 130-135 link for the restoration of either of the service paths assuming one unit of bandwidth for each LSP.

When the amount of reserved capacity on each link is a function of the LSPs that are to be restored on the link, signaling is required to reserve this capacity along the restoration path.

A. Restoration Path Reservation

In implementing shared mesh restoration, we assume there is a single pool of bandwidth capacity on each link for both service paths and restoration paths. Then the capacity for restoration paths may be reserved along the restoration path during LSP provisioning. The capacity reserved n each link along a restoration path may be shared across different restoration paths whose service paths are not expected to fall simultaneously. The restoration capacity might be either idle or used for pre-emptable LSPs. The amount of restoration capacity reserved on the restoration paths determines the robustness of the restoration scheme to failures. For example, a network operator may choose to reserve sufficient capacity to ensure that all restorable LSPs can be recovered in the event of any single failure (e.g., a conduit being cut). A network operator may instead reserve more or less capacity than that required to handle any single failure event, or may alternatively choose to reserve only a fixed pool independent of the number of LSPs requiring this capacity.

Figure 2:
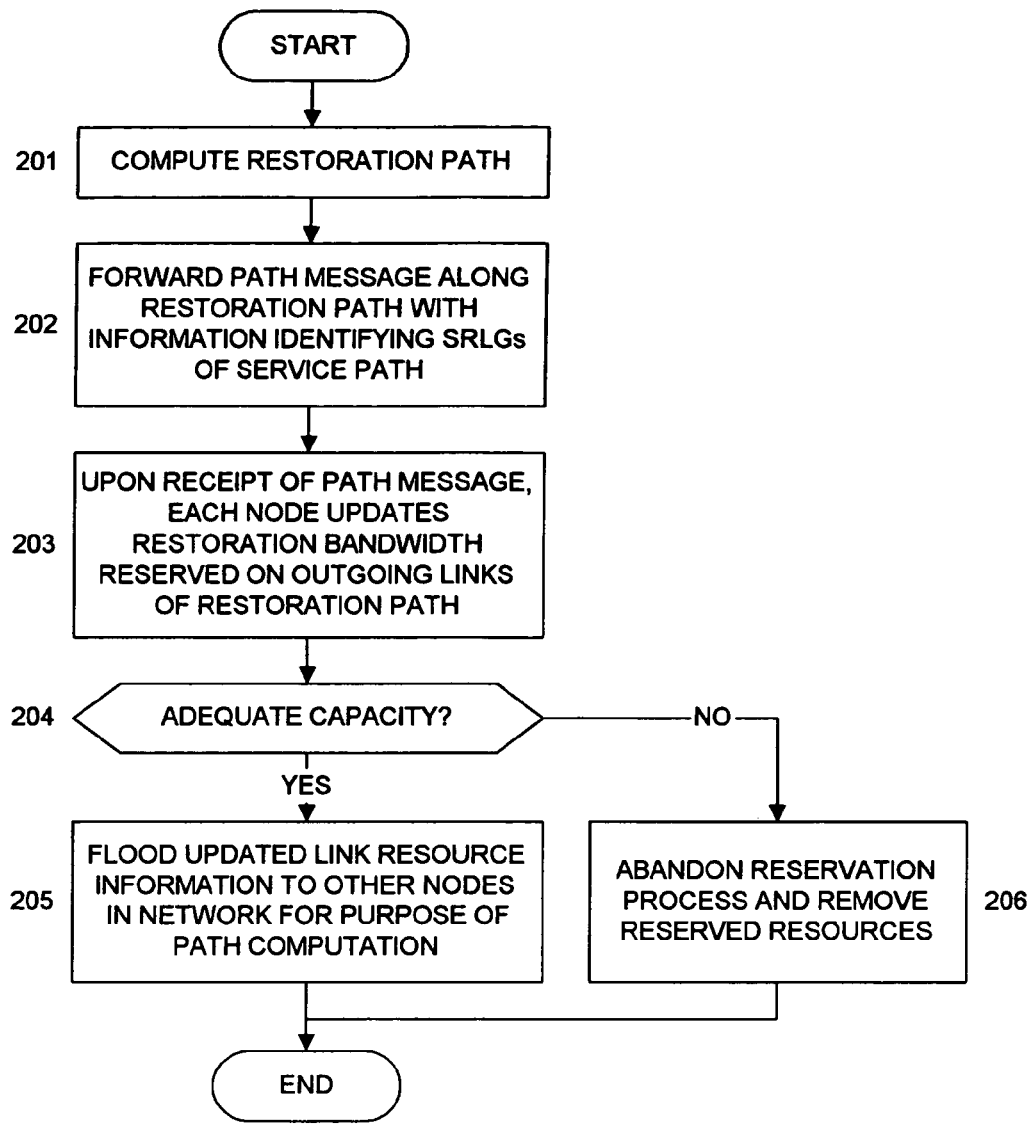
FIG. 2 is a flowchart of processing performed in resource reservation for restoration, in accordance with a preferred embodiment of an aspect of the invention.

FIG, 2 is a flowchart of processing performed in resource reservation for restoration in a mesh network, in accordance with a preferred embodiment of this aspect of the invention. FIG. 2 illustrates how extensions to RSVP signaling messages can be used to implement resource reservation for shared mesh restoration. It is assumed that, given GMPLS routing enhancements (see K. Kompella et al., "OSPF Extensions in Support of Generalized MPLS," IETF Network Working Group, Internet Draft, http://www.ietf.org/internet-drafts/draft-kompella-ospf-gmpls-extensions-01.txt (February 2001); K. Kompella et al., "IS-IS Extensions in Support of Generalized MPLS," IETF Network Working Group, Internet Draft, http://www.ietf.org/internet-drafts/draft-ietf-isis-gmpls-extensions-02.txt (February 2001)), each node will have a representation of the transport network topology, including the available capacity, capacity in service, and capacity reserved for restoration on each link. While a network operator wants to protect against any link failures, it is desirable to know the set of links used along the service path when reserving capacity on the restoration path. Alternatively, if it is desired to protect, more generally against what is referred to in the art as "shared risk link group" (SRLG) failures, the setup message should convey, when restoration capacity reservation is calculated along the restoration path, information about the SRLGs that are associated with the service path should be provided. In guaranteeing recovery from a single SRLG failure, two restoration paths can share resources if the corresponding service paths have no SRLG in common. In general, carriers will want to protect their network against at least any single failure event, such as a fiber cut, or a conduit cut. The SRLG concept may be generalized to represent a fiber, a node, or a conduit. Thus, for simplicity in the following description, it is assumed that the network operator is protecting against SRLG failures.

With reference to FIG. 2, when a restorable LSP request arrives, the source node calculates the service and restoration paths for the LSP at step 201. As alluded to above, it is advantageous for the two paths to be SRLG diverse. A conventional RSVP PATH message is sent along the calculated service path to establish the service path. To satisfy SLAs, the network may reserve resources along the chosen restoration path. To achieve this, the source node at step 202 sends a PATH message along the restoration path with a "shared reservation" flag requesting a shared reservation along the path.

FIG. 3 set forth an advantageous format for the PATH message. To implement restoration resource reservation for shared mesh restoration, a new mechanism must be introduced into PATH messages to distinguish between service path establishment, reservation of shared resources, or allocation of shared resources to a restoration path. The GMPLS signaling specifications currently define protection information object used in the LSP setup procedure. This protection information object is carried in a new object/TLV that includes a bit flag that indicates whether the LSP is a primary (service) path or a secondary (restoration) path. GMPLS also specifies a "Link Flags" field in the protection information object. The Link Flags field indicates the link protection type desired by the LSP. If a particular type is requested, the LSP request is processed only if the desired link protection type can be honored. FIG. 3A sets forth a new advantageous format for the protection information object. The S (secondary) bit in the protection information object, as shown in FIG. 3A, may be used to indicate that the LSP establishment is for a restoration/secondary path—not a service path. The shared resource reservation and shared resource allocation can be explicitly indicated through a new "Shared Reservation" flag in the protection information object. The Shared Reservation (R) flag may be encoded as follows:

"0"=allocation

"1"=reservation

If other flags are needed to support restoration, the shared reservation flag can be included in a "Path Flags" field. The protection information object would be used in the PATH/RESV message forwarded along the restoration path during restoration path resource reservation and resource allocation.

The nodes along the restoration path need to know the path taken by the service path so that reservations can be shared among multiple restoration paths whose service paths are SRLG-disjoint. Thus, the PATH message sent along the restoration path should include information about the service path. This information is communicated by introducing a new object, referred to by the inventors as the "service path information object" in the PATH message. There are two advantageous alternatives for the information that might be conveyed in the service path information object:

(1) LINK_LIST SERVICE_PATH INFORMATION object. The information can contain a list of the links along the service path. A LINK_LIST SERVICE_PATH INFORMATION object can be defined which denotes the set of TE links that are used along the service path. This information can be used directly when restoration bandwidth reservation accounts for link failures only. If SRLG failures in the restoration reservations are accounted for, then the use of the LINK_LIST requires the nodes along the restoration path to map from links to SRLGs.

(2) SRLG_LIST SERVICE_PATH INFORMATION object. Alternatively, the information can contain a list of the SRLGs traversed by the service path. If SRLG failures in the restoration reservations are accounted for, then carrying the LINK_LIST SERVICE_PATH INFORMATION object along the restoration path would require that every node duplicate the calculation of the associated set of SRLGs for the links along the service path. This calculation could instead be performed only at the source node, with the set of SRLGs then carried in the PATH message. Thus, it is advantageous to define a SRLG_LIST SERVICE_PATH INFORMATION object. The SRLG_LIST carries the list of SRLGs that are used by the service path. FIG. 3B shows how the information could be carried in the SRLG_LIST. Each SRLG in FIG. 3B is defined as a 32-bit unsigned number. In this SRLG list, the order of specific SRLGs is not significant.

The use of the SRLG_LIST is more straightforward and requires less processing at each node than the LINK_LIST. The LINK_LIST, however, in some realistic topologies, may be significantly shorter.

Accordingly, with reference to the message format shown in FIG. 3, shared restoration resource reservation is done if and only if the PATH message includes the <SERVICE_PATH_INFORMATION> and the <PROTECTION> objects with S and R (shared reservation) bits set. Otherwise, the <SERVICE_PATH_INFORMATION> is ignored and message processing is performed as usual. Shared restoration resource allocation is done if and only if the PATH/RESV message includes the <PROTECTION> object with S bit set and the R bit not set.

Thus, with reference again to FIG. 2, an RSVP PATH message containing a protection information object with the S and R (shared reservation) bits set is forwarded along the restoration path with information that identifies the SRLGs of the service path at step 202. This information, as described above, may be conveyed using either the LINK_LIST or the SRLG_LIST. Upon receipt of this message, at step 203, each node should then update the restoration bandwidth reserved on the outgoing links of the restoration path. Assume that each node maintains a Reservation array $R_j[i]$, $i=1,2,\ldots,K$, for each adjacent link j, where K is the maximum SRLG index. $R_j[i]$ indicates the bandwidth required on the link j if the i-th SRLG in the network fails. The total reserved restoration capacity on link j should be calculated as the maximum over all SRLGs (i.e., max $R_j[i]$, $i=1,2,\ldots,K$). When a node receives a new reservation message, it saves state relating to the LSP and updates the Reservation arrays on its link(s) in the following way: $R_j[i]=R_j[i]+$reservation bandwidth if the i-th SRLG is in the SRLGs associated with the <SERVICE_PATH_INFORMATION> object. Once $R_j[i]$ has been re-calculated for all SRLGs associated with the service path, a new required reserved capacity is calculated (i.e., max $R_j[i]=$ 1,2, . . . ,K). If at step 204 inadequate capacity is available to support this new resource reservation, the LSP reservation process may be abandoned, with an error message (PATHERR) being returned to the source at step 206. The already reserved resources must then be removed. However, if the reservation is successful and the reserved capacity has changed as a result of this new LSP reservation, then updated link resource information may be flooded to other nodes in the network for the purpose of path computation at step 205. For example, the reserved capacity may reduce the available bandwidth information that is flooded.

Similarly, when a node receives a message requesting the removal of reservations for an existing restorable LSP, the reserved restoration capacity along the restoration path is updated: $R_j[i]=R_j[i]$—reservation bandwidth if the i-th SRLG is in the set of SRLGs along the service path. Again, this update may result in a change in the link information that is flooded throughout the network.

Accordingly, the PATH message sent along the pre-calculated restoration path reserves the required restoration resources and creates shared reservation state relating to the LSP without cross-connecting the channels. A RESV message with the same flag can be returned to acknowledge the resource reservation along the restoration path without establishing the restoration path.

In general, depending on the network operator's desired functionality, channel selection may be performed either during the reservation stage, or after failure. If channels are pre-selected; the channel selection is stored during the resource reservation phase as part of the reservation state along the LSP's restoration path. Importantly, although the channels are pre-selected, the cross-connect is not established until after a failure. If channels are pre-selected during the reservation phase, then restoration message processing during restoration may be faster. However, if the pre-selected channels are dependent on the failure scenario, channel pre-selection may necessitate that fault isolation be performed before connectivity can be restored. Moreover, it is only possible to pre-select channels for a specific set of anticipated failures; if other failures occur, channels must in any event be selected after failure.

Alternatively, channel selection may be performed after failure on receipt of a signaling message for restoration. In this case, since restoration capacity along the restoration path is only reserved but not allocated, handling a fault translates into allocating the restoration path after failure. This requires efficient mechanisms for triggering and allocating the restoration path to meet the tight restoration timing constraints. The LSP restoration time will depend on the time to detect the failure, (possibly) localize the failure, notify the node(s) responsible for restoration, and finally activate the restoration path.

B. Restoration Path Setup

Failure detection and localization are technology and implementation dependent, and, accordingly, the present invention is intended to work independent of the mechanism used for failure localization and notification. In general, failures are detected by lower layer mechanisms (e.g., SONET/SDH, Loss-of-Light (LOL). When a node detects a failure, an alarm may be passed up to a GMPLS entity, which will take appropriate action. Restoration path setup can be triggered in many different ways—and at either the source node or destination node, or both.

Figure 4:
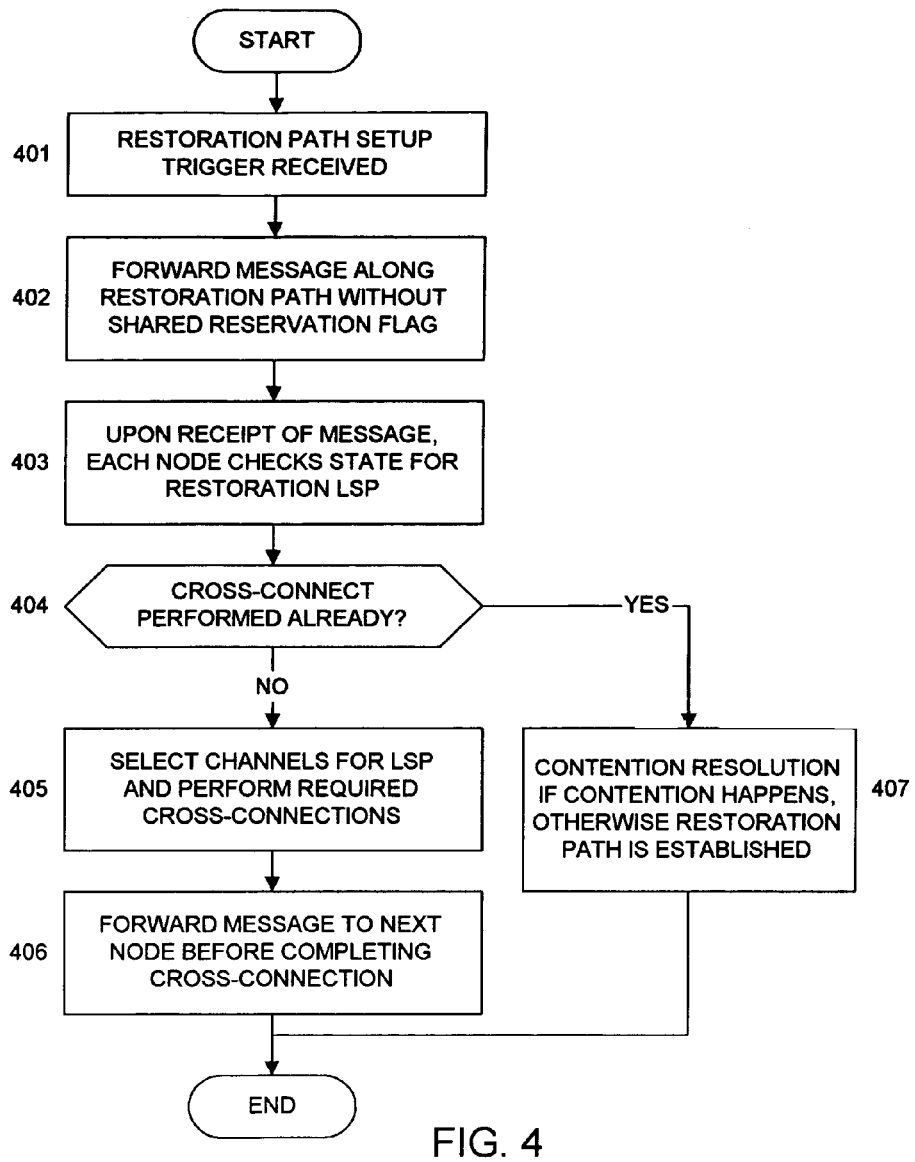
FIG. 4 is a flowchart of processing performed in restoration path setup, in accordance with a preferred embodiment of another aspect of the invention.

FIG. 4 is a flowchart of processing performed in establishing the restoration path after failure, in accordance with a preferred embodiment of this aspect of the invention. At step 401, the restoration path setup trigger is received, at either the source or destination node. When the service path fails, the restoration path should be established using the reserved restoration bandwidth on each link. If the restoration signaling is initiated by the source, the source node at step 402 sends a PATH message along the restoration path with the "shared reservation" flag not set, indicating that the restoration path should now be established. This is accomplished by sending a PATH message including the <PROTECTION> object with S bit set and the R bit not set. Since nodes along the path retained reservation state for the restoration path, this state can be used to ensure that restoration paths allocate resources out of the capacity reserved for restoration. Upon receipt of the PATH message, at step 403, the nodes along the restoration path should check the cross-connect state for this path. (This is needed in case restoration triggered from the destination node has already performed the cross-connection.) If the cross-connection has not been performed, at step 404, then the node should select channels (if not already pre-selected), and perform the required cross-connections at step 405. In nodes with significant cross-connect switching times (e.g., MEMS cross-connects) it is important to have the PATH message be forwarded without waiting for the cross-connection to be completed, as set forth in step 406. The destination node sends a RESV message to the source to acknowledge the successful establishment of the restoration path.

If the signaling is initiated by the destination, then at step 402 a RESV message is sent along the restoration path with the "shared reservation" flag not set. The RESV message is sent from the destination including the <PROTECTION> object with S bit set and the R bit not set. Upon receipt of the RESV message, at step 403, the nodes along the restoration path should check the cross-connection states for this path. If the cross-connection has not been performed, at step 404, then the node should select channels (if not already pre-selected), and perform the required cross-connections at step 405. In nodes with significant cross-connect switching times (e.g., MEMS cross-connects) it may be important to have the RESV message forwarded without waiting for the cross-connection to be completed, as set forth in step 406. The source node sends a RESV_CONF message to the destination to acknowledge the successful establishment of the restoration path.

If both ends initiate restoration, the PATH and RESV messages for the same restoration path may meet at an intermediate node, as set forth in step 407. This may result in label contention. For a uni-directional LSP, the contention is resolved using downstream label assignment. For a bi-directional LSP, the contention is resolved based on higher node-ID label assignment, as proposed for GMPLS. Alternatively, contention can be resolved using the methods disclosed in co-pending commonly-assigned Utility patent application, "METHOD FOR UNIDIRECTIONAL AND BIDIRECTIONAL LABEL SWITCHED PATH SETUP IN A LABEL SWITCHED NETWORK," Ser. No. 10/063,923, filed on May 24, 2002, which is incorporated by reference herein. When signaling messages from the two ends meet at an intermediate node, the node sends a RESV message to the source and RESV_CONF in response to the establishment of the restoration path.

When restoration is triggered from both source and destination, and PATH/RESV messages are forwarded without waiting for cross-connection as described above the receipt of the RESV or RESV_CONF does not guarantee the success of restoration path establishment. In this case, a subsequent error message may override the acknowledgment.

C. Error Handling

In shared mesh restoration schemes, the reserved restoration resources are limited. During a restoration path establishment, there may be scenarios in which the restoration path can't be setup, for example, if there aren't adequate reserved restoration resources or if there is a failure along the restoration path. In this case, PATHERR and RESVERR messages may be used to report the failure of restoration path establishment. It is important that any resources allocated by the incomplete restoration path establishment be immediately released such that these resources can be used for other restoration paths. In the RSVP-TE extensions proposed for GMPLS, the PATHERR message was extended to carry a "state_remove" flag to release the resources consumed by incomplete LSP establishment. In shared mesh restoration schemes, it is possible to define a new flag "allocation_remove", which could be carried in both PATHERR and RESVERR messages. Upon receipt of PATHERR or RESVERR messages with this "allocation_remove" flag, the node does not remove all local state but instead advantageously frees the cross-connect resources and releases the channels to the reserved capacity pool.

D. Normalization

After service path repair, it is generally desirable to normalize the LSP back to its original service path. Often, the routing of the restoration path may not be as efficient as the original service path. Additionally, once a restoration path is established, there is no guarantee that other service paths whose restoration paths were sharing the resources are protected, unless the other restoration routes are re-calculated. Reverting back to the service path after a failure is repaired requires that the service path's resources remain allocated during the time that the LSP uses restoration resources. For RSVP, techniques must be developed that allow service path resources to remain allocated even though refreshes may be affected by failed signaling channels. Moreover, it is important to have mechanisms that allow LSP normalization to be performed without disrupting service to the customer.

Figure 5:
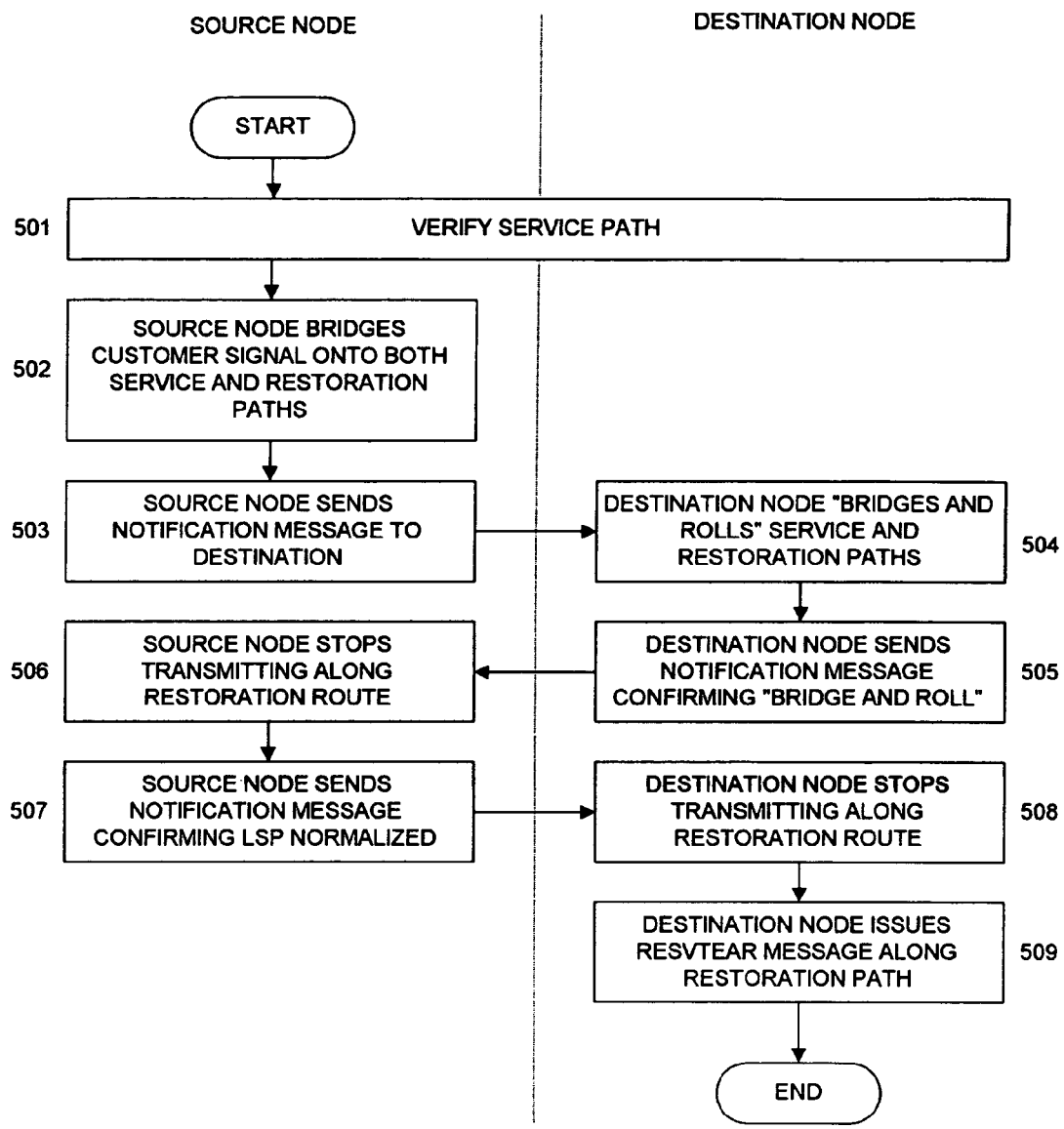
FIG. 5 is a flowchart of processing performed in path normalization, in accordance with a preferred embodiment of another aspect of the invention.

In accordance with a preferred embodiment of another aspect of the invention, FIG. 5 sets forth a flowchart of processing performed in path normalization that, advantageously, avoids service traffic interruption during the normalization process. At step 501, it is preferable that the service path by verified after repair. At step 502, the source node commences the process by "bridging" the customer signal onto both the service and restoration paths (the "bridge" function sends the customer input signal to both paths). Once the bridge process has completed, at step 503, the source node sends a Notification message to the destination, requesting that the destination "bridge and roll" the service and restoration paths (the "roll" function switches the signal sent to the customer from restoration path to service path). In this case, the "roll" function causes the destination to select the service path signal at step 504. Upon finishing the bridge and roll at the destination, at step 505, the destination sends a Notification message to the source confirming the completion of the bridge and roll operation. When the source receives this Notification, at step 506, it stops transmitting traffic along the restoration path, and, at step 507, sends another Notification message to the destination confirming that the LSP is normalized. Once the destination receives this Notification message, at step 508, it issues a RESVTEAR message along the restoration path and stops transmitting along the restoration path at steps 508-509. The RESVTEAR message informs the nodes along the restoration path to release the restoration resources if shared restoration is used for this LSP. This procedure achieves the "make-before-break" feature, that is, minimal service traffic interruption during the normalization process. Note that the RESVTEAR removes the cross-connection for the restoration path (and frees the resources to be used for restoring other failures), but does not delete the local state along the restoration path. In this case, the RESVTEAR should not trigger a PATHTEAR message from the source since we want resources to continue to be reserved for this LSP. This allows the termination node to quickly re-establish the restoration path by sending either a RESV or PATH message if the service path fails again in the future. The protection object with "shared reservation" flag is carried in the RESVTEAR message to suppress the PATHTEAR.

It is important to note that this normalization process is applicable to end-to-end restoration procedures as well as segment-based restoration procedures (i.e. where the restoration is performed between two nodes along a connection's path that are not necessarily the source and destination).

FIG. 6 sets forth an advantageous format for the NOTIFY message, which can be used to handle the signaling for the LSP normalization. The NOTIFY message should be extended to include a status field describing each of the different steps in the normalization process. The NOTIFY message, as shown in FIG. 6, includes the <ERROR_SPEC> object, which has four fields: node address, flags, code, and value. The node address represents the address of the node generating the notification message. New codes/values in the <ERROR_SPEC> object could be reserved to support normalization. Three new codes/values are needed: (1) a code indicating that bridging has been completed; (2) a code indicating that the roll/bridge has been completed; and (3) a code indicating that the roll has been completed. The NOTIFY messages can be sent using reliable UDP transmission or some other mechanism.

Additional mechanisms may be required in some-cases (e.g., all-optical networks) to ensure that intermediate nodes do not alarm due to LOL during the teardown procedure. See below, Section C.

As set forth in FIG. 5, it is advantageous to permit verification of the service path after successful repair of the failure and prior to commencing the above normalization procedure. Typically, there is a network management system (NMS) that manages the mesh network. The NMS provides a fault isolation and fault handling functions. When a node in the network detects a failure for a connection, it triggers the restoration process for the failed connection. The node also sends a failure notification message to the NMS. The nodes along the service path retain the connection state associated with the service path so that the service path can be normalized following failure repair. Otherwise, the service path should be established first without connecting to customer signals before normalization process. The fault isolation function of the NMS analyzes all failure notification messages, isolates the network failure, and issues a trouble ticket to initiate manual repair of the failure. In most cases, a technician will have to be sent to the failure site to repair the failure. The technician will report successful failure repair to the NMS. The NMS then triggers the restoration normalization process for the restored connections. As part of this process, the NMS may select a few or all of the restored connections for normalization. In distributed path restoration schemes, each connection is restored individually, and each connection can be independently normalized without coordination with other connections. In order to minimize the risk of having unsuccessful normalizations, it is preferable that each repaired service path be verified before the connection is switched back to the service path. This normalization/verification of the service path should only occur after the technician believes that the failure has been successfully repaired.

Figure 7:
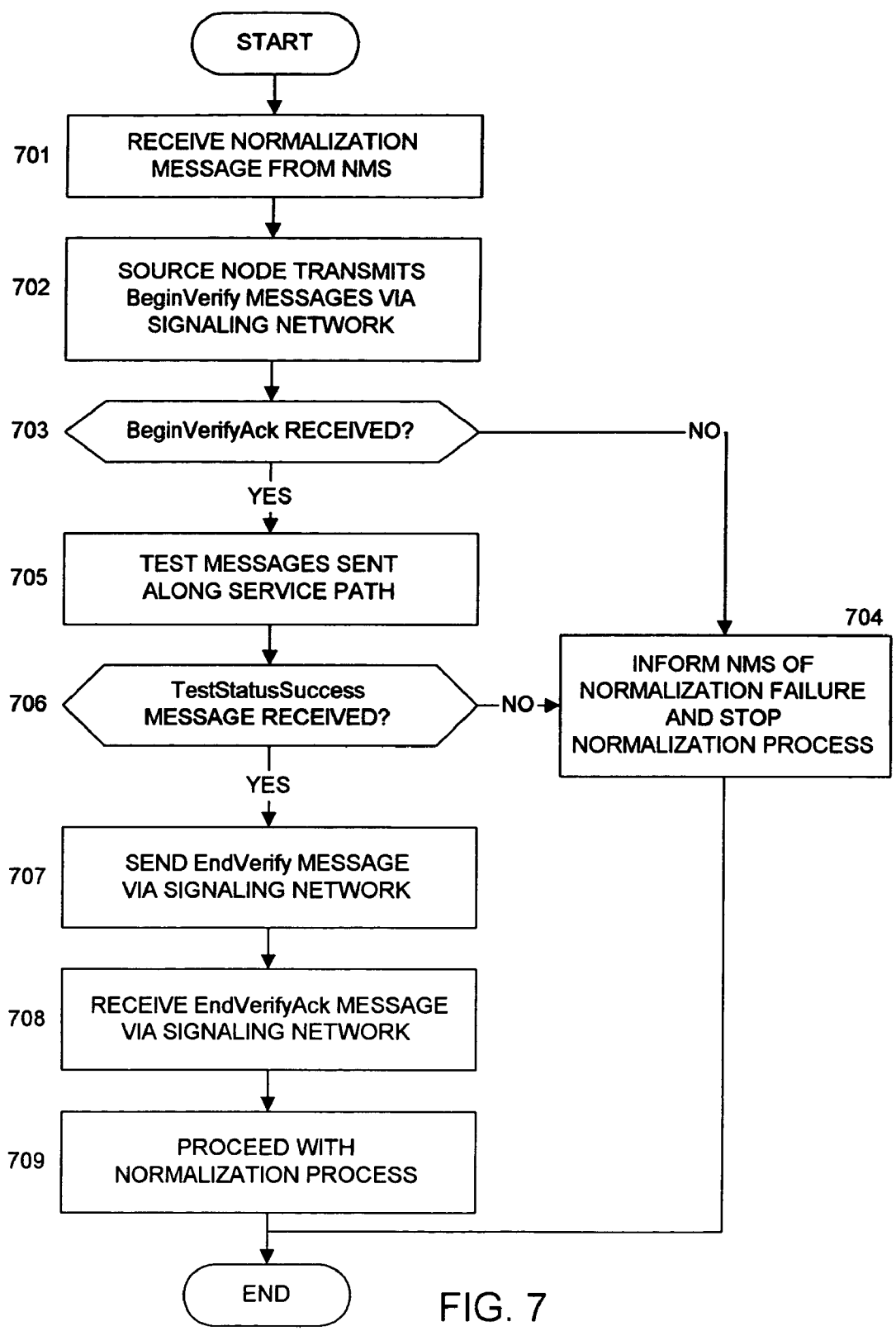
FIG. 7 is a flowchart of processing performed in service path verification, in accordance with a preferred embodiment of another aspect of the invention.

FIG. 7 sets forth a flow chart of processing performed for verifying the service path, in accordance with a preferred embodiment of this aspect of the invention. The process in FIG. 7 is described in the context of the Link Management Protocol ("LMP") which is specified to be used between neighboring nodes in GMPLS. See, e.g., J. Lang, et al., "Link Management Protocol (LMP)," IETF Network Working Group, Internet Draft, http//www.ietf.org/internet-drafts/draft-ietf-ccamp-lmp-00.txt (July 2001), which is incorporated by reference herein. One of the functions of LMP is to verify the physical connectivity of the data-bearing channels of neighboring nodes. Once LMP is implemented in network nodes, it is natural to treat the service path between non-neighboring nodes as a link, and use LMP to verify the connectivity of the repaired service path. This means that LMP would then be run between nodes that are not necessarily physically adjacent.

At step 701, it is assumed that the source node receives a normalization message from the NMS. Upon receipt of the normalization message, the source node at step 702 starts periodic transmission of LMP BeginVerify messages to the destination node via a signaling network, which provides out-of-band communication among the network nodes. The periodic transmissions continue until step 703 when the source receives a BeginVerifyAck or BeginVerifyNack from the destination node, or until the source times out. Once the destination receives a BeginVerify message, if it is ready to proceed with the verification procedure, it replies with a BeginVerifyAck to the source node via the signaling network. If the connection is bi-directional, the destination node starts to send TEST messages to the source along the service path at this time. If the destination cannot accept the BeginVerify request, it sends a BeginVerifyNack message to the source node. If the source node receives the BeginVerifyNack message, then at step 704, it informs the NMS of the normalization failure and stops the normalization process of this connection. If the source node receives a BeginVerifyAck message at step 703, it starts to send Test messages along the service path to the destination at step 704. This can be done because LMP assumes that the control processor in a node can send and receive LMP messages over any port. Note that in the preferred embodiment of the invention, all LMP messages except for the TEST message are sent via the signaling network; the TEST message is sent via the service path. Once a node receives the Test message, the TestStatusSuccess message is transmitted via the signaling network. If no TEST message is received before the timer expires, a TestStatusFailure message is transmitted via the signaling network. Upon receiving a TestStatusSuccess or TestStatusFailure at step 706, the node should send a TestStatusAck message back. After the source node has verified the physical connectivity of the service path, at step 707, it sends an EndVerify message via the signaling network to the destination node to terminate the path verification process. The EndVerifyAck message is sent back by the destination node via the signaling network upon receipt of an EndVerify message at step 708. This message acknowledges the termination of the path verification process. Note that this service path verification process has no impact on the connection itself. The connection is still up on the restoration path. After the service path verification process, if the service path is physically connected (i.e. the verification was a success), then the normalization process proceeds at step 709 as above.

It should be noted that the present invention, although described with particular reference to LMP, can be readily adapted to other signaling protocols such as LDP by one of ordinary skill in the art.

E. Path Deletion

Once an LSP is no longer required, the LSP service path and its restoration path reserved resources should be released for future traffic. A PATHTEAR message or RESVTEAR message as defined in the GMPLS signaling specification is used to remove (de--allocate) the paths. If the source node initiates the LSP deletion, it should send two PATHTEAR messages to the destination node: one along the service path and the other along the restoration path. The PATHTEAR along the restoration path should include information about the service path. The information can contain either a list of the links along the service LSP, or a list of the SRLGs traversed by the service path. If the destination initiates the LSP deletion, it should send two RESVTEAR messages to the source. The RESVTEAR along the restoration path should include the information about the service path.

Figure 8:
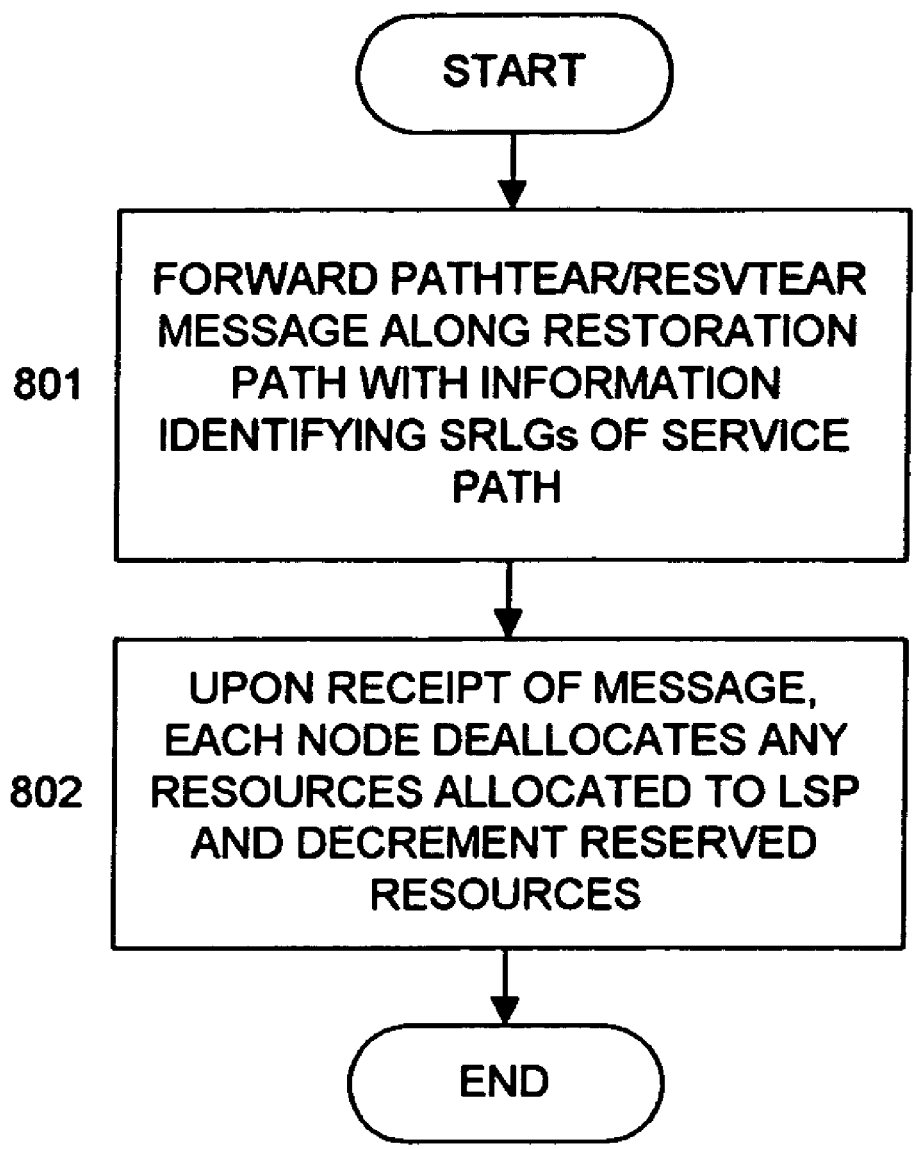
FIG. 8 is a flowchart of processing performed in path deletion, in accordance with a preferred embodiment of another aspect of the invention.

FIG. 8 sets forth a flowchart of processing performed in releasing the reserved restoration resources and any allocated resources along the restoration path. At step 801, the source/destination sends a PATHTEAR/RESVTEAR message along the restoration path, including the <SERVICE_PATH_INFORMATION> object. Upon receipt of this message, at step 802, each node along the restoration path should de-allocate any resources allocated to this LSP (e.g., if the LSP is currently using the restoration path) and decrement the reserved resources accordingly. FIG. 9 sets forth an advantageous format for the PATHTEAR message. The RESVTEAR message can be specified in an analogous manner.

It is important that valid signaling actions for planned events—e.g., LSP deletion—do not appear as failures along the path. Additional mechanisms may be required in some cases (e.g., all-optical networks) to ensure that nodes do not alarm due to LOL during the teardown procedure. If LSPs are deleted in an all-optical network by sending a single deletion message, LOL resulting from disconnection at a node will propagate down the path faster than the LSP deletion message, potentially triggering restoration. Thus, for planned events that could result in LOL along the path, such as LSP deletion, all nodes must be informed of the upcoming event so that they may turn off alarms corresponding to the desired LSP so as not to initiate restoration.

Restoration techniques can be classified into path-based and link-based: wherein "path-based" schemes are implemented via an alternate or restoration path that may traverse multiple nodes in contrast with "link-based" techniques wherein traffic is switched to an alternate channel or link connecting adjacent nodes. In general, path-based schemes may protect an end-to-end path, a segment or a link. The present invention, it should be noted, is applicable to all of these cases, although the above detailed description focuses primarily on end-to-end path-based restoration.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description describes an embodiment of the invention with particular reference to extensions to RSVP-TE. However, the principles of the present invention could be readily extended to other signaling protocols such as CR-LDP. Such an extension could be readily implemented by one of ordinary skill in the art given the above disclosure.

The invention claimed is:

1. A method for signaling in a mesh telecommunication network comprising: at a predetermined node in the mesh telecommunication network:
   receiving a request to establish a label switched path through the mesh network;
   computing a service path and a restoration path;

sending a label switched path request along the restoration path requesting reservation of shared resources along the restoration path without allocating the shared resources and wherein the label switched path request includes service path information; and responsive to a determination that the label switched path has been switched to the service path, sending a release request to a plurality of nodes along the restoration path, the release request configured to cause a release of a restoration path resource allocation, the label switched path switched responsive to a repair of a failure of at least one component comprised by the service path, the release request an RSVP-TE protocol request comprising a shared reservation flag configured to cause the release of the restoration path resource allocation without causing a release of reserved resources associated with the restoration path and without causing a removal of the restoration path.

2. The invention of claim 1 wherein the service path information comprises a list of links used along the service path.

3. The invention of claim 1 wherein the service path information comprises a list of shared risk link groups traversed by the service path.

4. The invention of claim 1 wherein the label switched path request is an RSVP PATH message.

5. The invention of claim 4 wherein the mesh network is an optical network.

6. A method for signaling in a mesh telecommunication network comprising the steps of:

at a predetermined node in the mesh telecommunication network, bridging a signal onto both a service path and a restoration path to a destination node in the mesh network the signal bridged responsive to a request to normalize a restored connection;

sending a first message to the destination node requesting that the destination node bridge and roll the service path and the restoration path; and if a second message is received from the destination node confirming that the destination node has bridged and rolled the service path and the restoration path, halting transmissions along the restoration path and sending a third message to the destination node confirming that the connection is normalized, the second message an RSVP-TE protocol message comprising an object that comprises a code, a first possible value of the code indicative that bridging has been completed, a second possible value of the code indicative that a roll/bridge has been completed, a third possible value of the code indicative that a roll has been completed.

7. The invention of claim 6 wherein the messages are RSVP messages.

8. The invention of claim 6 further comprising the step of verifying the service path prior to normalizing the connection.

9. The invention of claim 8 wherein the service path is verified using LMP.

10. A method for signaling in a mesh telecommunication network comprising the steps of:

from a predetermined node in the mesh telecommunication network, sending a second message to a source node confirming that a service path and a restoration path have been bridged and rolled, the second message sent responsive to a received first message, the first message sent responsive to a transmission of a signal, the signal bridged onto both the service path and the restoration path to a destination node in the mesh network, the bridged signal transmitted responsive to a request to normalize a restored connection, the second message an RSVP-TE protocol message comprising an object that comprises a code, a first possible value of the code indicative that bridging has been completed, a second possible value of the code indicative that a roll/bridge has been completed, a third possible value of the code indicative that a roll has been completed; and if a third message is received from the source node confirming that the connection has been normalized, sending a fourth message along the restoration path freeing resources reserved for the restoration path.

11. The invention of claim 10 wherein the messages are RSVP messages.

12. The invention of claim 10 further comprising the step of verifying the service path prior to normalizing the connection.

13. The invention of claim 12 wherein the service path is verified using LMP.

14. The method of claim 10, further comprising:

resolving a determined label contention associated with normalizing the connection via a downstream label assignment for a uni-directional Label Switched Path.

15. The method of claim 10, further comprising:

resolving a determined label contention associated with normalizing the connection via a higher node identification label assignment for a bi-directional Label Switched Path.

16. The method of claim 1, further comprising:

removing the reservation of shared resources along the restoration path responsive to an error message flag indicating that the restoration path could not be setup.

17. The method of claim 1, further comprising:

reserving the resources along the restoration path if and only if the label switched path request comprises the shared reservation flag, the shared reservation flag indicative of whether other flags are needed to support restoration.

18. The method of claim 1, further comprising:

allocating the shared resources along the restoration path responsive to the failure.

19. The method of claim 1, wherein the label switched path request comprises a bit flag indicative of whether the label switched path is the service path or the restoration path.

20. The method of claim 1, wherein the label switched path request comprises a secondary bit indicative that the restoration path is a backup path for the service path.

* * * * *